2 Sheets—Sheet 1.
H. R. MASON.
TRAIN SIGNALING APPARATUS.
No. 11,343. Reissued May 30, 1893.
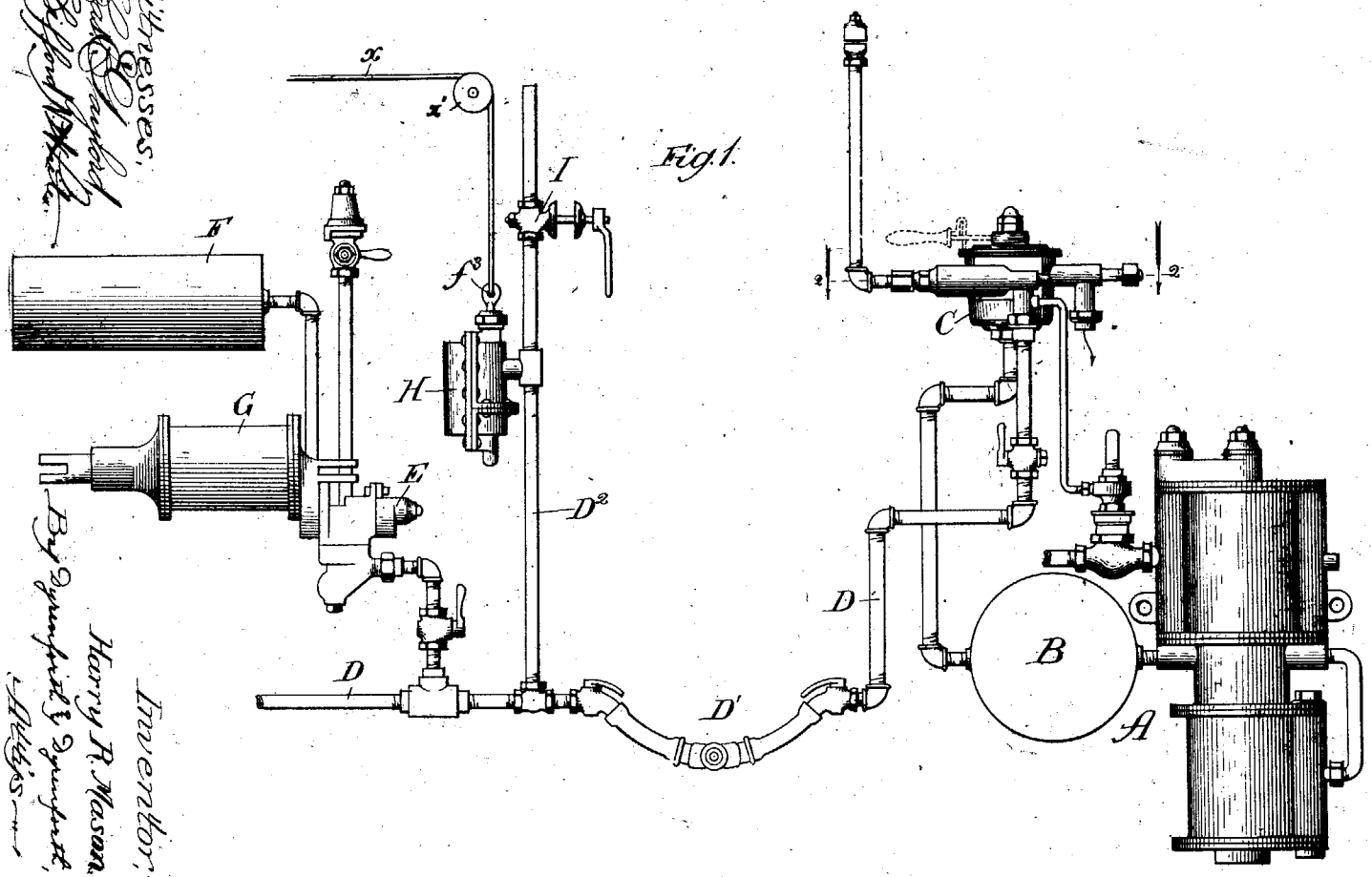
Witnesses.
Chas. E. Gaylord
Clifford W. Hale
Inventor,
Harry R. Mason.
By Dyrenforth & Dyrenforth,
Attys.

2 Sheets—Sheet 2.
H. R. MASON.
TRAIN SIGNALING APPARATUS.
No. 11,343. Reissued May 30, 1893.
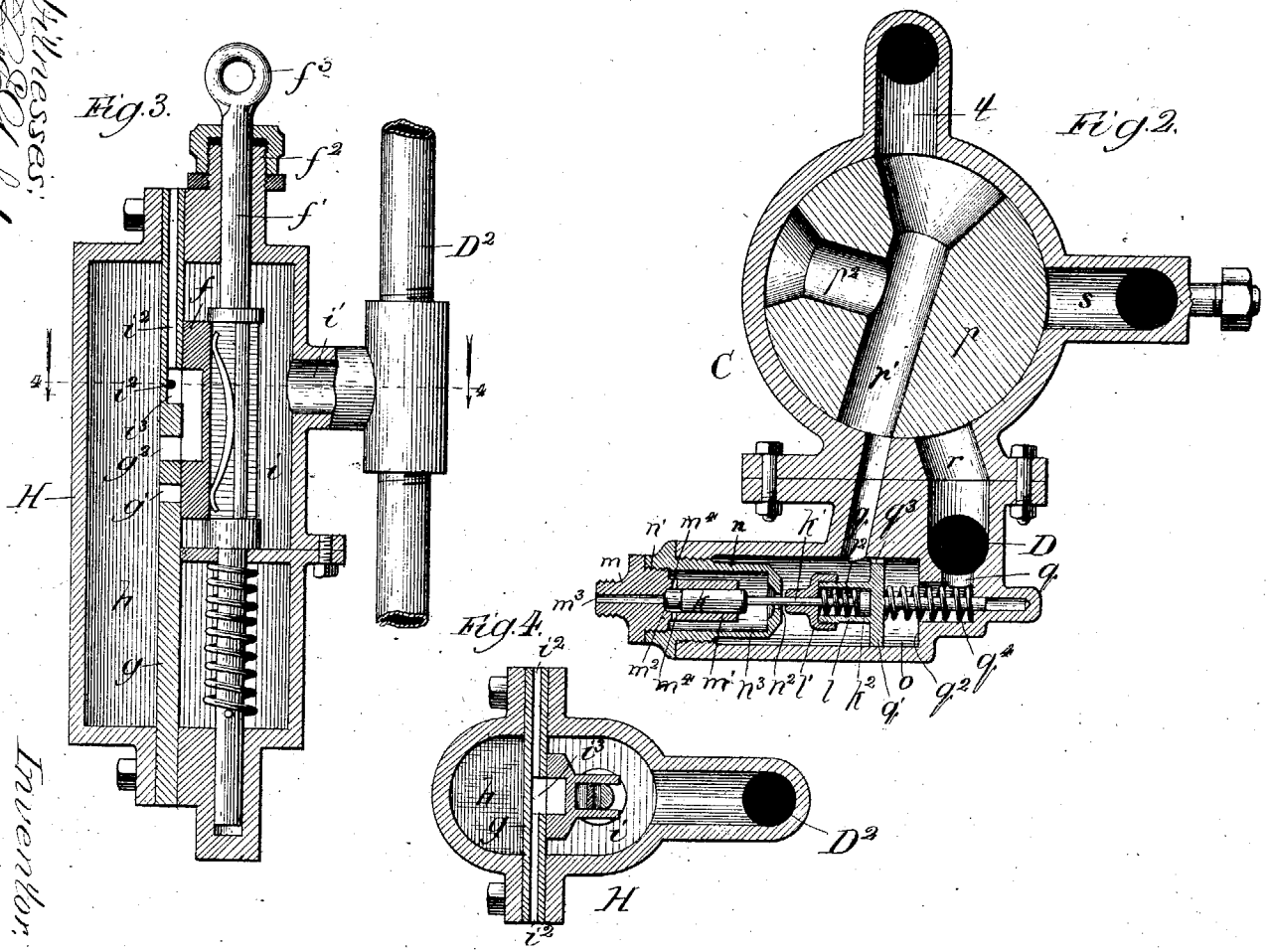
Witnesses:
Chas. E. Gaylord.
Gilbert N. White.
Inventor:
Harry R. Mason.
By Dyrenforth & Dyrenforth,
Attys.

UNITED STATES PATENT OFFICE.

HARRY R. MASON, OF CHICAGO, ILLINOIS.

TRAIN SIGNALING APPARATUS.

SPECIFICATION forming part of Reissued Letters Patent No. 11,343, dated May 30, 1893.

Original No. 450,333, dated April 14, 1891. Application for reissue filed November 15, 1892. Serial No. 452,103.

*To all whom it may concern:*

Be it known that I, HARRY R. MASON, a citizen of the United States, residing at Chicago, in the county of Cook and State of Illinois, have invented a new and useful Improvement in Train Signaling Apparatus, of which the following is a specification.

My invention relates to improvements in pneumatic signaling apparatus and is particularly designed for use upon railway-trains employing air-brakes of the class generally in use, wherein the brakes are maintained in the state of release by a supply of air-pressure in the brake-pipe, and are applied by a reduction of pressure in the latter, my main object being to provide improved signaling mechanism consisting of a signal within hearing of the engineer and in direct communication with the said brake-pipe to be actuated by a reduction of air pressure therein, and exhaust valves or "conductors' signal-valves" upon the cars of the train in convenient locations at which air from the brake-pipe may be caused to escape to reduce the pressure therein sufficiently to actuate the signal without setting the brakes.

One effect of my invention is to dispense with the separate independent train-pipe parallel with the brake-pipe, which has been hitherto provided for signaling purposes, and thus save the expense attendant upon its construction and repair, as well as giving other advantages.

Referring to the drawings, Figure 1 is a broken diagrammatic view of the various appliances of an air-brake system embodying my improvements; Fig. 2, an enlarged sectional view of the engineer's brake-valve taken on line 2—2 of Fig. 1 and viewed in the arrows; Fig. 3, an enlarged broken view showing the conductor's signaling-valve in vertical section, and Fig. 4 a section taken on line 4—4 of Fig. 3 and viewed in the direction of the arrows.

Of the various appliances shown in Fig. 1, and which, with the exceptions of the engineer's brake-valve, the signal, and the conductor's signaling-valve, are those in use in the Westinghouse system of air-brakes, A is the air-pump; B, the main air-reservoir; C, the engineer's brake-valve; D D, the brake-pipe; D′, the hose-sections and couplings therefor between cars; E, a triple valve; F, an auxiliary reservoir; G, a brake-cylinder; H, a conductor's signaling-valve, and I a conductor's brake-valve.

The engineer's brake-valve shown, and the one I prefer to employ, is of special construction, and so much of its construction as relates to an engineer's valve alone, as such, for regulating the supply of air to and the exhaust from the brake-pipe forms the subject of Letters Patent of the United States No. 450,332, granted to me April 14, 1891, for a brake valve for air brakes. It involves, generally stated, a shell having a port $t$, communicating with the main reservoir, an exhaust-port $s$, passages $r$ and $q$, communicating with the brake-pipe, a rotary valve-plug $p$ in the shell provided with the diagonal passage $p'$ and branch passage $p^2$, and a movable diaphragm or piston-valve $q'$, interposed in the passage $q$ and having its seat at $q^2$, and provided at its periphery with one or more small passages $q^3$. The valve $q'$ is maintained normally open by a spring $q^4$.

In operation, to exhaust pressure from the brake-pipe and apply the brakes, the plug $p$ is turned to cause its passage $p'$ to register with the exhaust-port $s$ and its branch passage $p^2$ with the port or passage $r$. Pressure is supplied to the brake-pipe to release the brakes by turning the plug to cause its passage $p'$ to extend from the port $t$ to the port $r$, and when the pressure in the brake-pipe has been raised to that entering the port $t$ the plug is turned to the position shown, whereby the pressure is directed through the passage $q$. The resilient quality of the spring $q^4$ is such that the passage of air through the passage $q^3$ to overcome any reduction of pressure in the brake-pipe due to slight leakage in the system would not affect the position of the valve $q'$, while any exhaust from an undue cause, as the parting of a coupling or the opening of the conductor's valve, would cause the said valve to be forced to its seat by the pressure from the main cylinder, and thus prevent exhaust of the latter, which was the main object of the invention.

Besides performing the function described, a valve in the nature of the valve $q'$, located, as this one is, in a passage auxiliary to the main or direct air-passage, offers facilities for the operation of a signal to be actuated by the movement of the valve toward its seat. Thus the signal may be produced by having the valve, in its movement, make or break contact in an electric circuit for actuating a gong or other alarm, or by extending the stem of the valve through the shell and connecting it with or placing in its path a signal or signal-operating mechanism. Mechanisms for carrying out my invention by the two methods suggested have been devised, but are reserved for separate applications for Letters Patent.

My present application relates to the system generically and to the specific means for carrying it into effect which, as at present advised, I prefer—that is to say, through the medium of a whistle located in the engine-cab and actuated by the progressive movement of the valve.

In Fig. 2 is shown in detail mechanism connected with the valve $q'$ for producing the sounding of a whistle. The passage $q$ extends through a chamber $o$, in which the valve $q'$ works, and screwed into the end of the chamber $o$ opposite the valve-seat $q^2$ is a hollow plug $n$, open at its outer end $n'$ and having a central reduced opening $n^2$ in its end nearest the valve-seat $q^2$. The interior of the hollow plug $n$ affords a chamber $n^3$, which is closed at its end $n'$ by a screw-plug $m$. The plug $m$ is provided in its inner end portion with a central longitudinally-extending piston-chamber $m'$, terminating abruptly at $m^2$, from which extends a narrow central passage $m^3$ through the outer end portion of the said plug. Intersecting the chamber $m'$ adjacent to its end $m^2$ are one or more small passages $m^4$ through its shell and communicating with the chamber $n^3$. Upon the side of the piston-valve $q'$ opposite the seat $q^2$ is a chamber $l$, closed by a centrally-perforated screw-cap $l'$. In the chamber $m'$ is a piston-valve $k$ upon one end of a stem $k'$, which latter extends loosely through the opening $n^3$ and cap $l'$ into the chamber $l$, where it is provided with a head $k^2$. About the stem $k'$ and confined between the cap $l'$ and head $k^2$ is a spring $l^2$, which operates normally to press the head $k^2$ against the side of the valve $q'$. When the valve $q'$ is in its normal position shown, the valve $k$ is pressed at its outer end against the seat $m^2$ by the spring $q^4$ to close the passage $m^3$, and around its said end the valve $k$ is reduced in circumference to a distance beyond the passages $m^4$. The opening $n^2$ is somewhat larger than the diameter of the stem $k'$, and the inner end of the piston $k$ is arranged to seat against and close the opening $n^2$ when the valve $q'$ is forced to its seat. The outer end of the plug $m$ connects with a whistle, as shown in Fig. 1.

In operation, the valve $p$ being in the condition shown in Fig. 2, which is the running position, as described, any exhaust of pressure in the brake-pipe beyond that which the spring $q^4$ is arranged to withstand will cause the valve $q'$ to be moved toward its seat and draw with it the valve $k$. The chamber $n^3$ is charged with air-pressure from the chamber $o$ through the opening $n^2$, and when the valve $k$ is thus withdrawn from its seat at $m^4$ air from the chamber $n^3$ will flow through the passages $m^4$ and $m^3$ and sound the whistle. Should the reduction of pressure in the brake-pipe be from any violent cause, as the opening of the conductor's-valve or the parting of a coupling, or the like, the valve $q'$ will be forced to its seat, shutting off the flow of air to the brake-pipe, the valve $k$ will close the opening $n^2$ to prevent escape of air through that channel, and in the meantime the whistle will be sounded to warn the engineer by the expansion of air from the chamber $n^3$.

In order to adapt the signal mechanism described to the purpose of a conductor's signal, I provide a spring $q^4$, which will, without yielding, withstand a pressure of, say, three pounds, which is more than is necessary to prevent movement of the valve $q'$ when slight leakages exist in the system, and which shall require a pressure of, say, ten pounds to compress it sufficiently to bring the valve $q'$ to its seat. Thus a sudden reduction of five pounds in the brake-pipe will cause the excess of pressure from the main reservoir to move the valve more or less in the direction of its seat and open the valve $k$ until the pressure on opposite sides of the valve $q'$ is equalized by the passage of air through the channel $q^3$. A sudden great reduction of pressure in the brake-pipe, which would produce closing of the valve $q'$, would necessitate a turning of the valve $p$ to open communication between the main reservoir and passage $r$ in order to permit the valve $q'$ to be opened again. In order, therefore, that when the conductor or other person operates the signal no more air shall escape from the brake-pipe than is necessary to simply withdraw the valve $k$ from its seat without closing the valve $q'$, I provide upon each car of the train, if it be a passenger-train, or upon the caboose if it be a freight-train, a conductor's signaling-valve II, which may be of the construction shown in detail in Figs. 3 and 4. The valve II is supported upon a branch $D^2$ of the brake-pipe and comprises a shell divided internally into two chambers $i$ and $h$ by a diaphragm $g$. The chamber $i$ communicates through an opening $i'$ with the branch pipe $D^2$. In the diaphragm are one or more close passages $i^2$, which lead from a recess $i^3$ to the open air. Extending through the diaphragm are openings $g'$ and $g^2$. In the chamber $i$ is a spring-controlled slide-valve $f$, the stem $f'$ of which extends to the outside of the shell through a stuffing-box $f^2$, where it is provided with a ring $f^3$. The slide-valve $f$ shuts off all communication between the chamber $i$ and passages $i^2$, and when in normal position it opens communication between the chamber $h$ and outside air through the passages $g^2$ $i^3$ $i^2$ and closes the opening $g'$ to shut off communication between the chambers $h$ and $i$. When the valve is moved from its normal position against the resistance of its spring, it closes the outlet $g^2$ and opens the passage $g'$. The chamber $i$ is charged with air-pressure from the pipe $D^2$. The chamber $h$ is of internal dimensions which, when the passage $g'$ is opened, will cause the air expanded into it from the chamber $i$ to reduce the pressure in the latter chamber, branch pipe $D^2$, and brake-pipe to create a negative impulse, or impulse of reduction in the latter which will travel to the signal valve $q'$ and cause the same to be actuated. The ring $f^3$ may be connected to a cord $x$, which runs over a pulley $x'$ and extends along the car in the same manner as a bell-cord. To signal the engineer, the operator pulls the cord $x$, which moves the valve $f$ to close the outlet $g^2$ and open the passage $g'$. The expansion of pressure into the chamber $h$ produces a sudden limited reduction of pressure in the brake-pipe, which by creating an impulse of reduction which travels to the signal valve $q'$, causes the excessive pressure behind the valve $q'$ to move the latter slightly and open the valve $k$ to sound the whistle. The air from the main reservoir passing through the openings $q^3$ in the valve $q'$ quickly raises the pressure in the brake-pipe again to normal, producing an equilibrium of pressure on opposite sides of the said valve, which permits the spring $q^4$ to force back the valve $q'$ and return the valve $k$ to its seat. Thus the opening of the valve $k$ is only momentary, causing the air which escapes through the passage $m^3$ to produce a sharp quick sound of the whistle. When the cord $x$ is released by the operator, the valve $f$ is instantly returned to its normal position by its spring, closing communication between the chambers $h$ $i$ and opening the passage from the chamber $h$ to the open air, to which all pressure from the chamber $h$ will immediately escape. The signaling mechanism, when operated, is certain and practically instantaneous in its action, so that several signals may be given in the space of a few seconds.

I do not limit myself to details of the construction of the valve mechanism for actuating the signal nor the conductor's signaling-valve, which are susceptible of modifications that would not depart from the spirit of my invention.

Furthermore, the conductor's signaling valve is not to be limited to use with a signaling system employing the brake pipe air as a signaling medium. An exhaust or vent valve constructed on the principle of my conductor's signaling valve will be found useful in various signaling connections in which it is desired to create impulses of reduction in a pipe charged with air under pressure, and to have air-escape regulating mechanism at the vent valve which will operate positively to limit the volume of air escaping with each operation.

What I claim as new, and desire to secure by Letters Patent, is—

1. The combination with a pipe charged with fluid under pressure, and signaling mechanism to be actuated by impulses of reduction in the said pipe, of valve mechanism communicating with the said pipe, for creating the said impulses of reduction, provided with air escape limiting means, operating when the valve is actuated, to vent only a predetermined relative extent of pressure from said pipe without regard to the time consumed in operating said valve, substantially as and for the purpose set forth.

2. The combination, with a pipe charged with fluid under pressure and signaling mechanism communicating therewith to be actuated by impulses of reduction of pressure in the said pipe, of a valve for creating said impulses, communicating with the said pipe and with an expansion chamber and operative at will to throw the said chamber alternately into and out of communication with the said pipe and the outside air, whereby with each complete operation it will vent air from the said pipe into the said chamber and then close communication between the pipe and chamber and open the chamber to the outside air, substantially as and for the purpose set forth.

3. In an air-brake system for railway-trains, the combination, with the brake-pipe, of signaling mechanism upon or near the engine-cab connected directly with the brake-pipe and actuated by a reduction of pressure therein, and a conductor's signaling-valve upon a car of the train connected with the brake-pipe and provided with air-escape-regulating mechanism, whereby in each operation of the conductor's signaling-valve only a limited reduction of the pressure in the brake-pipe can be effected without reference to the time which the conductor's signaling-valve is caused to remain open, substantially as described.

4. In a train-signaling system, the combination, with the conduit-pipe charged with artificially-created fluid-pressure, of a conductor's signaling-valve upon a car of the train having an inlet-port from the said conduit-pipe and an exhaust-port to the outside air, and air-escape-regulating mechanism between the said ports, whereby in each operation of opening the conductor's signaling-valve only a limited reduction of the pressure in the conduit-pipe can be effected without reference to the time which the conductor's signaling-valve is caused to remain open, substantially as described.

5. In an air-brake system for railway-trains, the combination, with the brake-pipe, of signaling mechanism upon or near the engine-cab connected directly with the brake-pipe and actuated by a reduction of pressure therein, and valve mechanism upon a car of the train connected with the brake-pipe and provided with an expansion-chamber, whereby it is capable, with each operation, of effecting a reduction of the pressure in the brake-pipe, limited by the capacity of the expansion-chamber, which is less than the reduction necessary to apply the brakes, substantially as described.

6. In an air-brake system for railway-trains, the combination, with the brake-pipe and main air-reservoir, of a main and a supplemental air-passage between the brake-pipe and main reservoir, engineer's brake-valve mechanism between the said passages and main reservoir, operative to direct pressure from the main reservoir through either of said passages at will, a valve in said supplemental passage normally open and adapted to be moved in the direction of its seat by a rush of air to it from the main reservoir in excess of the normal, and signaling mechanism actuated by movement of the said valve, substantially as described.

7. In an air-brake system for railway-trains, the combination, with the brake-pipe and main air-reservoir, of a main and a supplemental air-passage between the brake-pipe and main reservoir, engineer's brake-valve mechanism between the said passages and main reservoir operative to direct pressure from the main reservoir through either of said passages at will, a spring-controlled valve in said supplemental passage held normally open by its spring and adapted to be moved in the direction of its seat by an impulse of pressure against it from the main reservoir above a certain determined limit in excess of the pressure in the brake-pipe, and to be closed only by an impulse of pressure from the main reservoir above a certain determined limit, which is still further in excess of the pressure in the brake-pipe, signaling mechanism actuated by movement of the said valve, and valve mechanism upon a car of the train connected with the brake-pipe and capable when operated of effecting only such a limited reduction of the pressure in the brake-pipe as will cause the impulse of pressure from the main reservoir to move the valve in the said supplemental pipe without closing it, substantially as described.

8. In a signaling apparatus for railway-trains, the combination, with a pipe charged with an artifically-created fluid-pressure, of a movable diaphragm or equivalent piston in the said pipe moved by a variation of the pressure on its opposite sides, signaling mechanism actuated by movement of the said diaphragm or piston, an expansion-chamber on one of the cars of the train connected with the said pipe, and a signaling-valve interposed between the said pipe and expansion-chamber, operative alternately to afford communication between the said pipe and expansion-chamber and between the expansion-chamber and outside air, whereby with each operation of the signaling-valve to open it only such limited exhaust of pressure from the said pipe will result as will charge the said chamber, and whereby when the said valve is closed the pressure in the said chamber will escape to the open air, substantially as and for the purpose set forth.

9. In an air-brake system for railway-trains, the combination, with the brake-pipe and main air-reservoir, of a main and a supplemental air-passage between the brake-pipe and main reservoir, engineer's brake-valve mechanism between the said passages and main reservoir, operative to direct pressure from the main reservoir through either of said passages at will, a valve in said supplemental passage normally open and adapted to be moved in the direction of its seat by a reduction of pressure in the brake-pipe, signaling mechanism actuated by movement of said valve, an expansion-chamber upon a car of the train connected with the brake-pipe and having an exhaust-passage to the outside air, and a signaling-valve interposed between the brake-pipe and expansion-chamber, operative alternately to afford communication between the brake-pipe and expansion-chamber and between the expansion-chamber and outside air, whereby in each operation of opening and closing the signaling-valve the said chamber will be filled with pressure from the brake-pipe and then exhausted, effecting only such a reduction of pressure in the brake-pipe as will move the valve in the said supplemental passage without setting the brakes, substantially as described.

10. In an air-brake system for railway-trains, the combination, with the brake-pipe and main air-reservoir, of a main and a supplemental air-passage between the brake-pipe and main reservoir, engineer's brake-valve mechanism between the said passages and main reservoir, operative to direct pressure from the main reservoir through either of said passages at will, a spring-controlled valve in said supplemental passage held normally open by its spring, partly closing the said passage, and adapted to remain unaffected by movement of air to it to overcome a certain limited reduction of pressure in the brake-pipe to be moved part way to its seat by a limited reduction of pressure in the brake-pipe beyond said first limit to be moved to its seat to close the passage only by a reduction of pressure in the brake-pipe beyond said second limit, signaling mechanism actuated by movement of the said valve, an expansion-chamber of predetermined capacity upon a car of the train connected with the brake-pipe and having an exhaust-passage to the outside air, and a signaling-valve interposed between the brake-pipe and expansion-chamber, operative alternately to afford communication between the brake-pipe and expansion-chamber and between the said chamber and outside air, whereby in each operation of opening and closing the signaling-valve the said chamber will be filled with pressure from the brake-pipe and then exhausted, effecting only such a reduction of pressure in the brake-pipe as will cause the valve in the said supplemental passage to be moved without being closed, substantially as described.

HARRY R. MASON.

In presence of—
J. W. DYRENFORTH,
M. J. FROST.